(12) United States Patent
Franckhauser et al.

(10) Patent No.: US 10,640,284 B2
(45) Date of Patent: May 5, 2020

(54) AEROSOL DISPENSER WITH VENTED VALVE CUP AND VALVE CUP THEREFOR

(71) Applicant: The Procter & Gamble Company, Cincinnati, OH (US)

(72) Inventors: Andrew William Franckhauser, Batavia, OH (US); Scott Edward Smith, Cincinnati, OH (US); Douglas Bruce Zeik, Liberty Township, OH (US); Nathan Daniel Grubbs, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/809,085

(22) Filed: Nov. 10, 2017

(65) Prior Publication Data

US 2019/0135530 A1 May 9, 2019

Related U.S. Application Data

(63) Continuation-in-part of application No. 15/804,031, filed on Nov. 6, 2017.

(51) Int. Cl.
*B65D 83/44* (2006.01)
*B65D 83/70* (2006.01)
(Continued)

(52) U.S. Cl.
CPC .............. *B65D 83/44* (2013.01); *B65D 83/32* (2013.01); *B65D 83/38* (2013.01); *B65D 83/62* (2013.01);
(Continued)

(58) Field of Classification Search
CPC .......... B67D 1/12; B67D 1/125; B65D 83/70; F16K 24/02; F16K 24/04
See application file for complete search history.

(56) References Cited

U.S. PATENT DOCUMENTS

| | | | | |
|---|---|---|---|---|
| 468,258 A | * | 2/1892 | Painter | B65D 41/12 215/328 |
| 2,822,961 A | * | 2/1958 | Seaquist | B65D 83/70 220/89.4 |

(Continued)

FOREIGN PATENT DOCUMENTS

| | | |
|---|---|---|
| DE | 9208050 U1 | 10/1993 |
| JP | 2004099180 A | 4/2004 |

(Continued)

OTHER PUBLICATIONS

U.S. Appl. No. 15/235,227, filed Aug. 12, 2016, Douglas Bruce Zeik, et al.
(Continued)

*Primary Examiner* — Paul R Durand
*Assistant Examiner* — Randall A Gruby
(74) *Attorney, Agent, or Firm* — Sarah M DeCristofaro; Abbey A Lopez

(57) ABSTRACT

An aerosol dispenser, and a valve cup for an aerosol dispenser. The aerosol dispenser, has an outer container with a crimp ring, to receive a valve cup clinched thereto. The valve cup has an outer wall with holes therethrough or vents having a vector component parallel to the outer wall. The hole or vents may be exposed to pressurized propellant and product due to deformation of the neck during undue internal pressurization. The holes and vents relieve propellant and product therethrough in the event of overpressurization.

8 Claims, 11 Drawing Sheets

(51) Int. Cl.
*B65D 83/38* (2006.01)
*B65D 83/32* (2006.01)
*B65D 83/62* (2006.01)
*F16K 24/04* (2006.01)
*B65D 83/14* (2006.01)

(52) U.S. Cl.
CPC .............. *B65D 83/70* (2013.01); *F16K 24/04* (2013.01); *B65D 83/752* (2013.01)

(56) References Cited

U.S. PATENT DOCUMENTS

| | | | |
|---|---|---|---|
| 2,863,699 A * | 12/1958 | Elser | B65D 83/14 222/402.24 |
| 2,880,744 A * | 4/1959 | Daley, Jr. | F15B 21/044 137/197 |
| 3,074,602 A * | 1/1963 | Shillady | B65D 83/70 222/397 |
| 3,292,826 A * | 12/1966 | Abplanalp | B65D 83/70 222/397 |
| 3,333,743 A * | 8/1967 | Meyers | B65D 83/38 222/402.1 |
| 3,372,827 A * | 3/1968 | Altschuler | B65D 23/0814 215/12.2 |
| 3,403,804 A | 10/1968 | Colombo | |
| 3,404,863 A * | 10/1968 | Green | B65D 83/46 251/170 |
| 3,450,254 A * | 6/1969 | Miles | B65D 23/02 206/216 |
| 3,450,305 A * | 6/1969 | Buchanan | B65D 83/70 220/203.09 |
| 3,724,727 A | 4/1973 | Zundel | |
| 3,759,414 A * | 9/1973 | Beard | B65D 83/70 220/203.09 |
| 3,786,967 A * | 1/1974 | Giocomo | B65D 83/38 222/397 |
| 3,815,534 A | 6/1974 | Kneusel | |
| 3,850,339 A * | 11/1974 | Kinkel | B65D 83/70 220/203.09 |
| 3,912,130 A * | 10/1975 | Pelton | B65D 83/70 222/396 |
| 3,918,610 A * | 11/1975 | Willis | B65D 83/70 222/397 |
| 3,918,611 A * | 11/1975 | Ewald | B65D 83/20 222/396 |
| RE30,093 E | 9/1979 | Burger | |
| 4,323,203 A | 4/1982 | Neufeld | |
| 4,330,066 A | 5/1982 | Berliner | |
| 4,721,224 A * | 1/1988 | Kawabata | B65D 83/70 220/89.2 |
| 4,852,807 A * | 8/1989 | Stoody | B65D 83/46 239/337 |
| 4,969,577 A * | 11/1990 | Werding | B65D 83/14 141/3 |
| 5,038,952 A * | 8/1991 | Dorfman | B65D 41/10 215/324 |
| 5,121,858 A * | 6/1992 | Chong | B65D 83/70 137/467 |
| 5,199,615 A | 4/1993 | Downing et al. | |
| 5,219,005 A | 6/1993 | Stoffel | |
| 5,249,701 A * | 10/1993 | Daehn | B65D 83/38 220/612 |
| 5,460,300 A | 10/1995 | Tritsch | |
| 6,019,252 A | 2/2000 | Benecke et al. | |
| 6,039,222 A | 3/2000 | Smith | |
| 6,253,970 B1 * | 7/2001 | Kohn | B65D 83/70 137/843 |
| 6,254,820 B1 | 7/2001 | Cornell | |
| 6,375,045 B1 * | 4/2002 | Ki | B05B 11/00416 222/386 |
| 7,028,866 B2 | 4/2006 | Kunesh et al. | |
| 7,279,207 B2 | 10/2007 | Darr | |
| 7,303,087 B2 * | 12/2007 | Flashinski | B65D 83/38 215/311 |
| 7,971,759 B2 * | 7/2011 | Dalan | B65D 83/70 137/68.27 |
| 8,074,847 B2 | 12/2011 | Smith | |
| 8,096,327 B2 | 1/2012 | Hirz | |
| 8,439,223 B2 | 5/2013 | Smith et al. | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,752,731 B2 | 6/2014 | Nimmo et al. | |
| 8,844,765 B2 | 9/2014 | Tryon | |
| 8,869,842 B2 | 10/2014 | Smith | |
| 8,960,503 B2 * | 2/2015 | Soliman | B65D 83/38 222/402.1 |
| 9,061,795 B2 | 6/2015 | Girardot et al. | |
| 9,132,955 B2 | 9/2015 | Smith et al. | |
| 9,174,229 B2 | 11/2015 | Smith | |
| 9,199,783 B2 * | 12/2015 | Wanbaugh | B05B 11/3047 |
| 9,296,550 B2 | 3/2016 | Smith et al. | |
| 9,334,103 B2 | 5/2016 | Soliman | |
| 9,394,098 B2 * | 7/2016 | Kohls | B65D 83/48 |
| 9,505,509 B2 | 11/2016 | Smith | |
| 9,758,294 B2 * | 9/2017 | McDaniel | B29B 11/14 |
| 2002/0027146 A1 | 3/2002 | De Laforcade et al. | |
| 2002/0033394 A1 * | 3/2002 | Towfighi | B65B 31/003 220/89.2 |
| 2008/0164256 A1 * | 7/2008 | Youm | B65D 83/70 220/203.08 |
| 2009/0014679 A1 * | 1/2009 | Hygema | B65D 83/38 251/368 |
| 2011/0248035 A1 | 10/2011 | Piersman et al. | |
| 2012/0241457 A1 | 9/2012 | Hallman et al. | |
| 2012/0291911 A1 | 11/2012 | Smith | |
| 2016/0368633 A1 | 12/2016 | Smith et al. | |
| 2016/0368700 A1 | 12/2016 | Smith et al. | |
| 2017/0183137 A1 * | 6/2017 | Walton | B65D 23/00 |
| 2017/0341849 A1 | 11/2017 | Wolak et al. | |
| 2018/0155115 A1 | 6/2018 | Wolak et al. | |

FOREIGN PATENT DOCUMENTS

| | | |
|---|---|---|
| JP | 2005162231 A | 4/2006 |
| JP | 2013249073 A | 12/2013 |
| JP | 2013249074 A | 12/2013 |
| WO | WO9006889 A1 | 6/1990 |
| WO | WO 91/08099 A1 | 6/1991 |

OTHER PUBLICATIONS

U.S. Appl. No. 15/235,279, filed Aug. 12, 2016, Douglas Bruce Zeik, et al.

U.S. Appl. No. 15/444,354, filed Feb. 28, 2017, Douglas Bruce Zeik, et al.

U.S. Appl. No. 15/444,356, filed Feb. 28, 2017, Scott Edward Smith, et al.

* cited by examiner

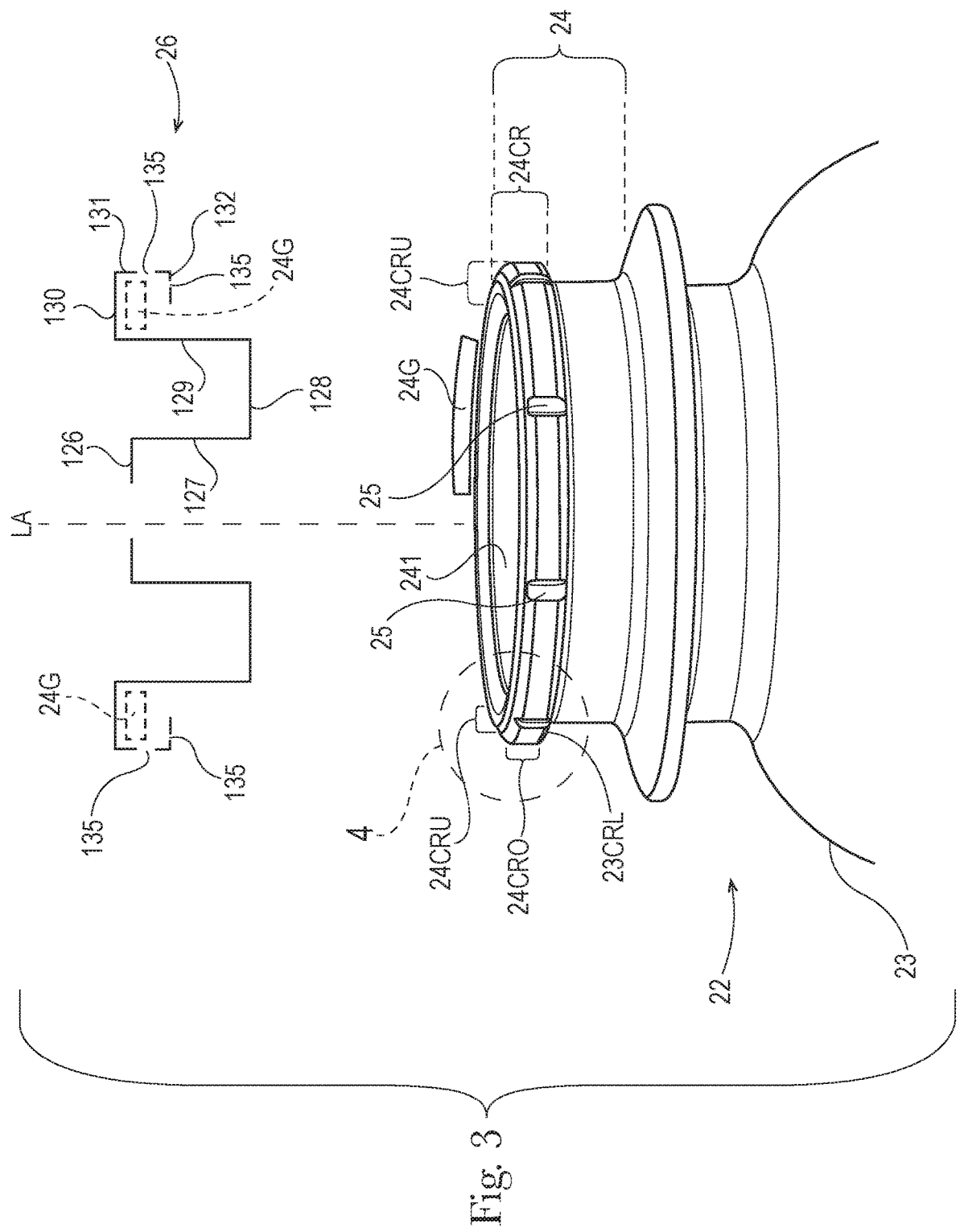

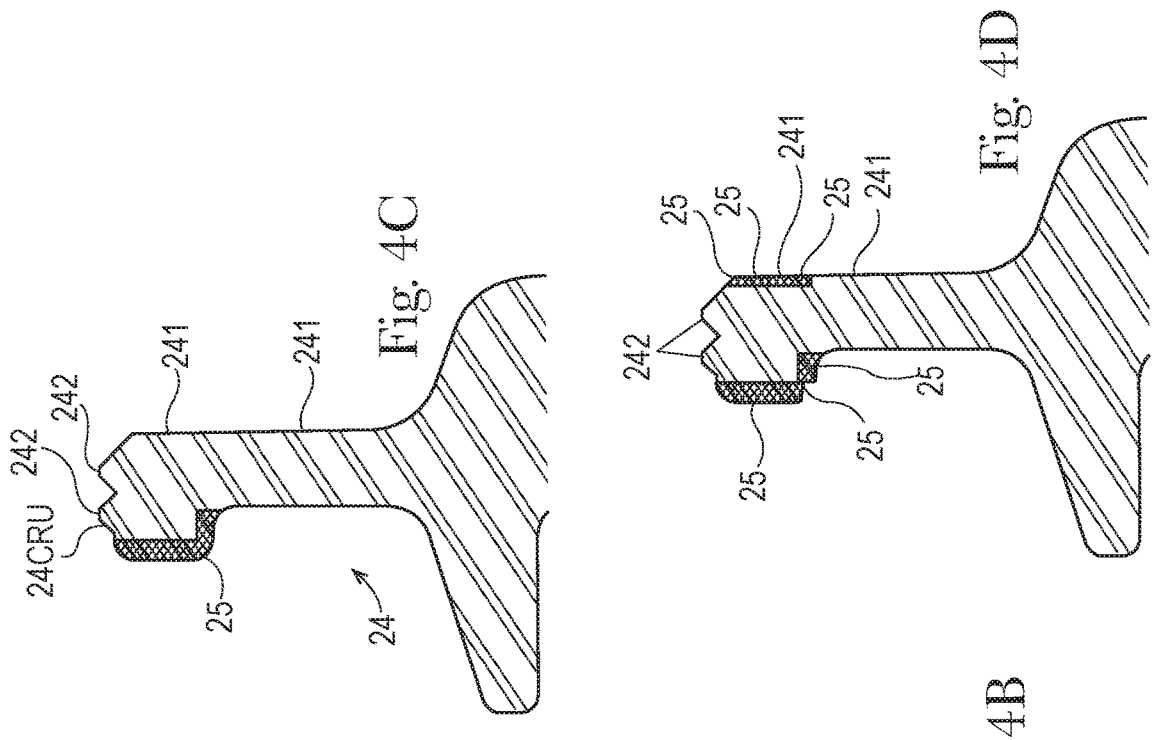

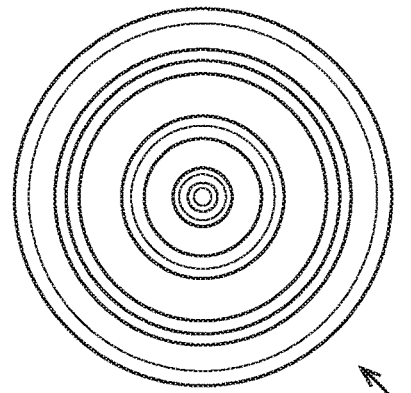
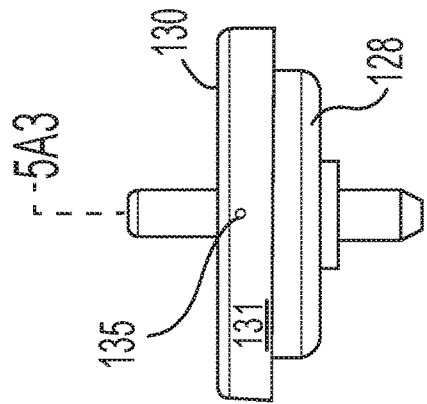
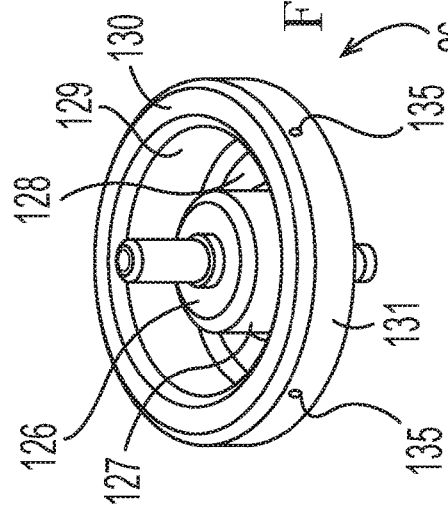
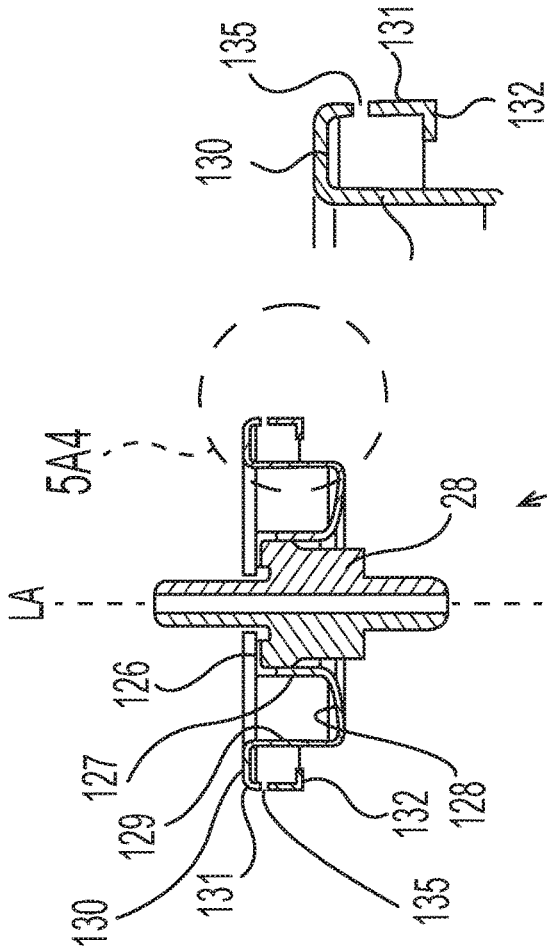

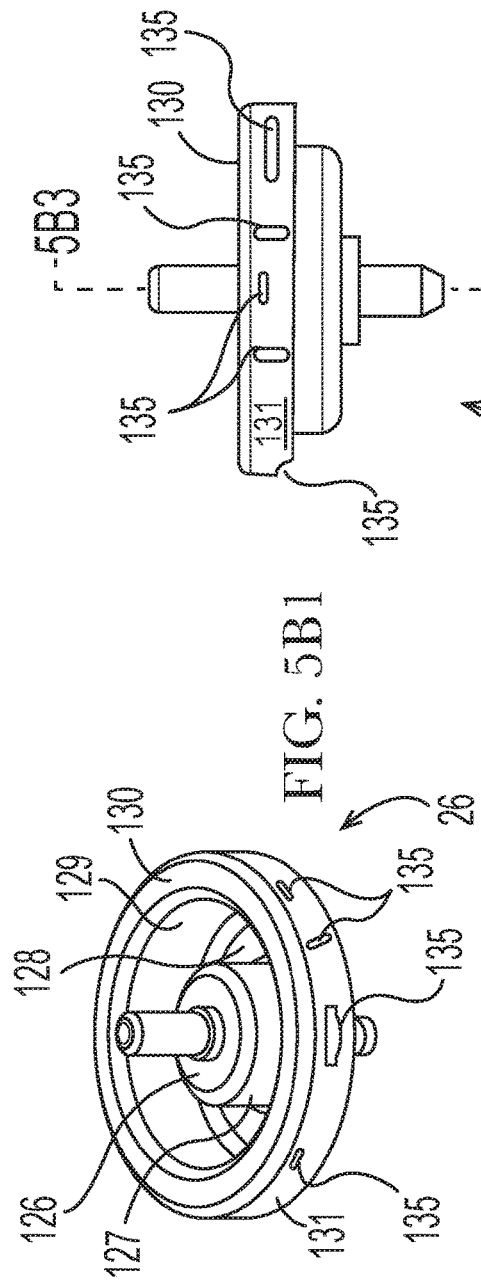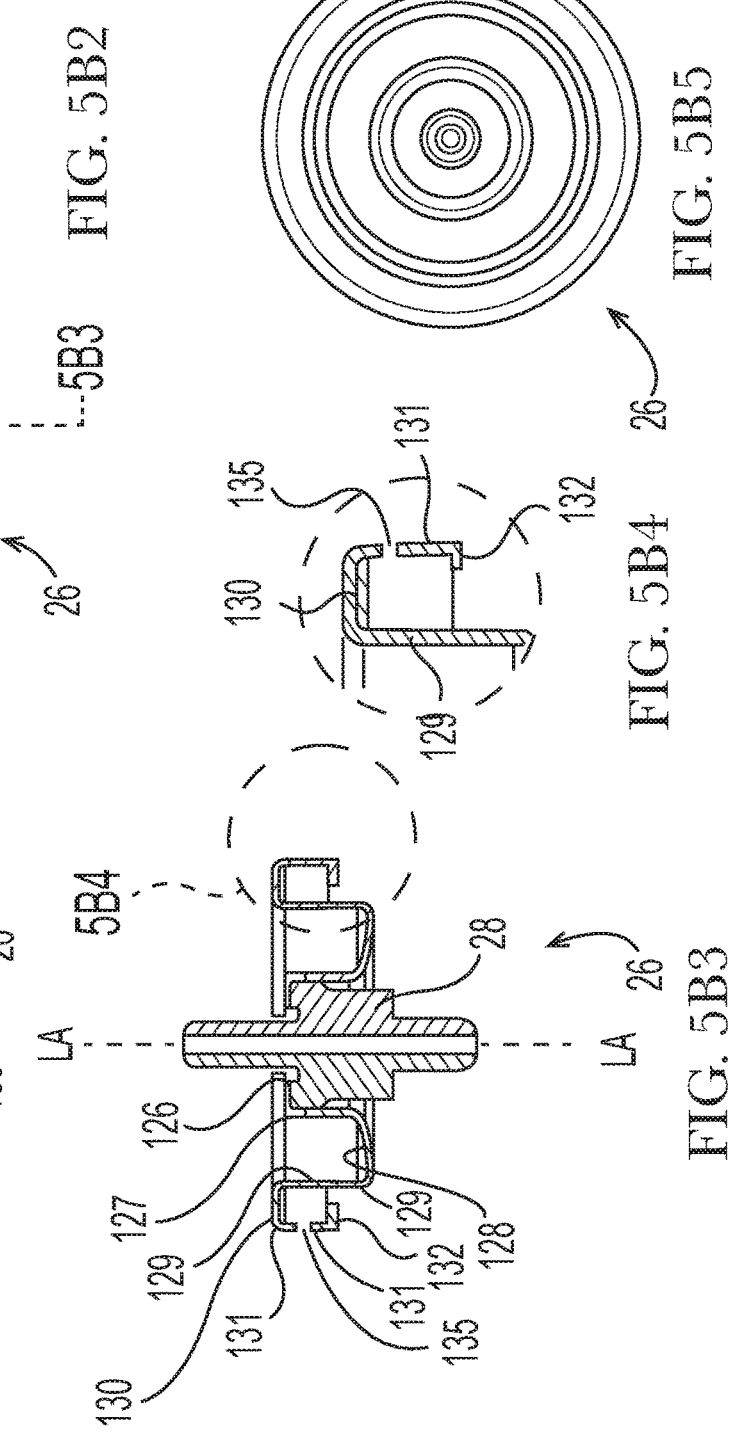

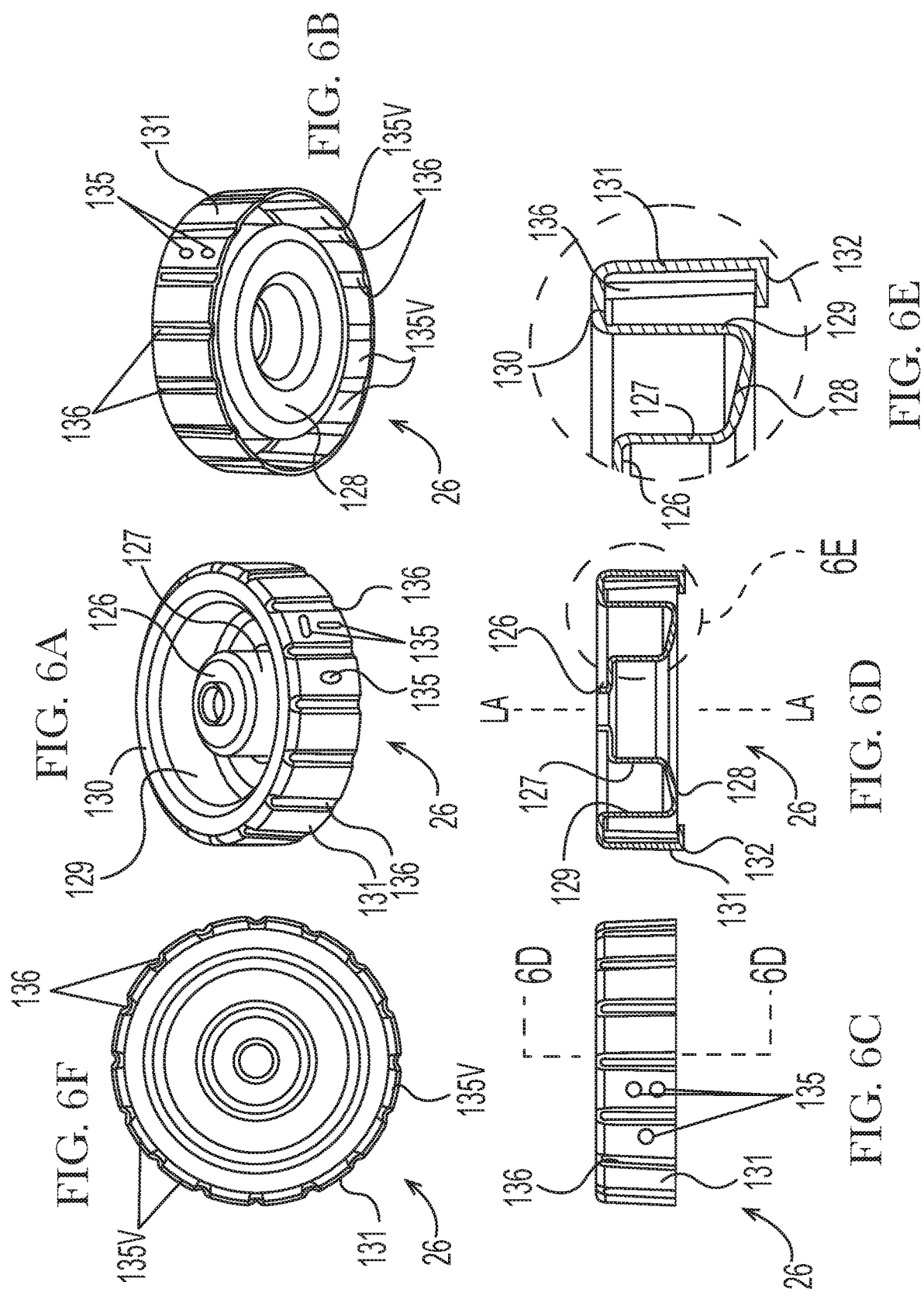

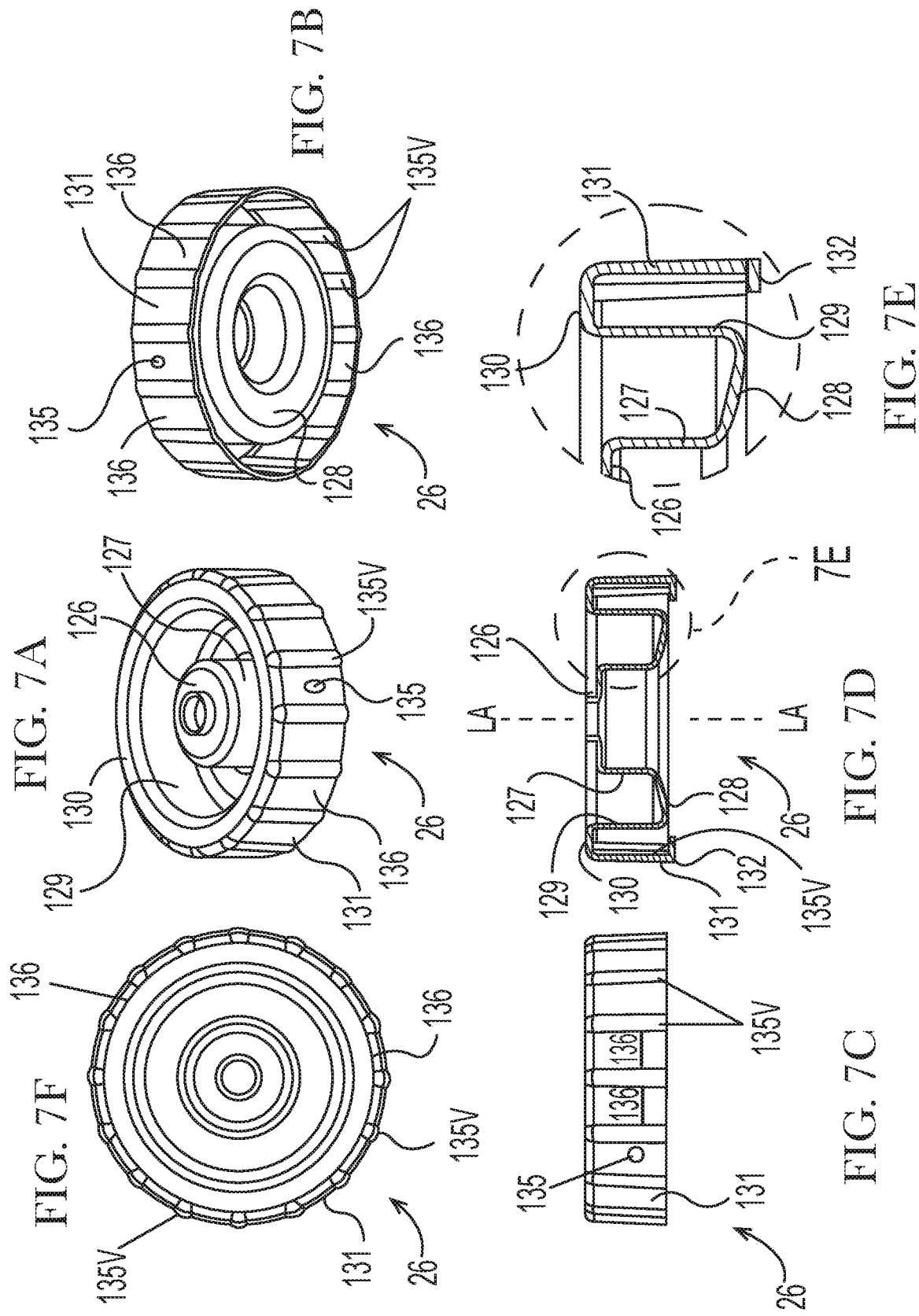

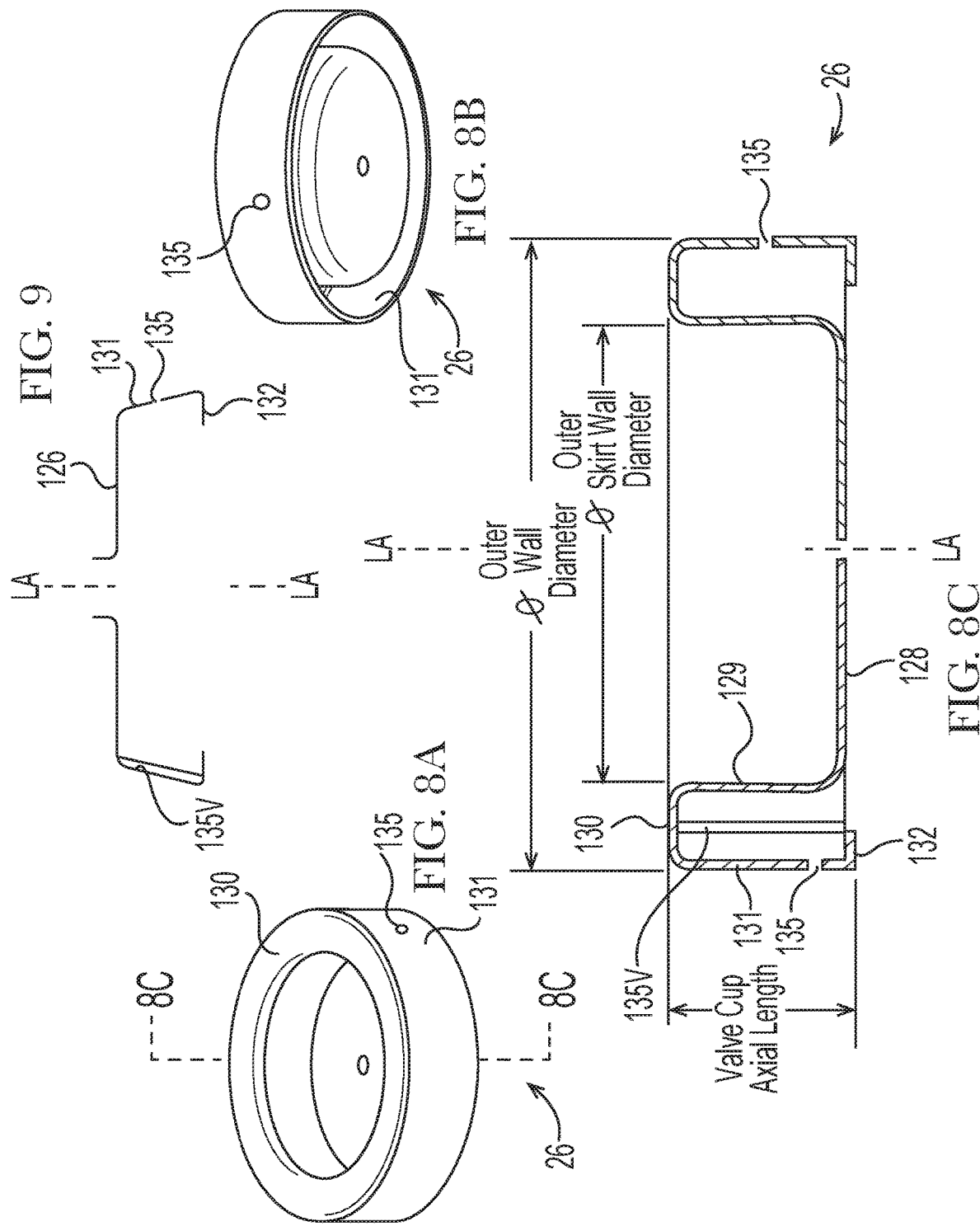

AEROSOL DISPENSER WITH VENTED VALVE CUP AND VALVE CUP THEREFOR

FIELD OF THE INVENTION

The present invention relates to aerosol dispensers having an integral valve cup vent, and the valve cup to make such an aerosol dispenser.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 9,296,550; 9,334,103 and 2009/0014679.

The outer containers are typically, but not necessarily, cylindrical. The outer container may comprise a closed end bottom adjoining the sidewalls and for resting on horizontal surfaces such as shelves, countertops, tables etc. The bottom of the outer container may comprise a re-entrant portion as shown in U.S. Pat. No. 3,403,804 or base cup as shown in U.S. Pat. No. 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765 and 8,869,842. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, but may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve and plastic valve cup are used. Suitable interlocks include bayonet fittings and threads as disclosed in commonly assigned P&G application, Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned application, P&G Case 14458, Ser. No. 15/235,227, filed Aug. 12, 2016 which teaches attaching a bag to a valve cup.

If a bag configuration is desired, propellant may be disposed between the bag and outer container, as disclosed in commonly assigned U.S. Pat. Nos. 8,631,632 and 8,869,842. Afterwards, product fill may occur in a separate, remote, operation, optionally carried out in another location, which may be in the same country or in a different country. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; and publications WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned application P&G Case 14461, application Ser. No. 15/235,279, filed Aug. 12, 2016.

Alternatively, a dip tub may be used if intermixing of the product and propellant is desired. When the user actuates the valve, the product and propellant are dispensed together through the dip tube. One configuration is shown in commonly assigned U.S. Pat. No. 6,039,222. This embodiment may utilize a dip tube. The dip tube takes the product and propellant mixture from the bottom of the outer container. Or a piston may be used to expel product, if it is particularly viscous, as described in commonly assigned US publication 2016/0368633.

But aerosol dispensers have typically been used to dispense products which can be used independent of the product temperature. For example, aerosol dispensers are commonly used to dispense cleaning products, insecticide, air fresheners, shaving cream, etc. These products are ubiquitously dispensed at the temperature ambient to the aerosol dispenser, typically room temperature.

But room temperature may not be optimum for all products. Some products may be more optimally used in a warmed or heated condition, the terms being used interchangeably. For example, certain foods are more palatable when served warm. Air freshener may disperse better when warmed. Shaving cream may be perceived to be more comfortable when warmed. Commonly assigned applications, P&G Case 14735, application Ser. No. 15/444,354 and P&G Case 14736, Ser. No. 15/444,356 disclose heating of aerosol dispensers in a microwave oven.

Overpressurization, and rupture may occur, for example, during microwave heating if a microwavable aerosol is left unattended or during manufacture if excessive propellant charge occurs. U.S. Pat. No. 9,394,098 teaches an adapter collar which can purportedly function as a safety shield in the event of overpressurization and rupture. But this attempt adds complexity and additional leakage pathways. And this adapter collar may be ineffective in the case of rupture. U.S. Pat. Nos. 3,074,602; 3,292826; 3,372,827 and 3,815,534 teaches score lines and a pressure relief valve for an aerosol can. But these attempts in the art rely upon precise tolerances and precision manufacture to properly work relieve pressure in the event of overpressurization. Such tolerances may be difficult to maintain in high speed production.

Accordingly, it is an object of this invention to provide an aerosol dispenser which minimizes occurrences of rupture in the event of overpressurization, through integral venting using the valve cup.

SUMMARY OF THE INVENTION

In one embodiment the invention comprises an aerosol dispenser for dispensing a product therefrom and having a longitudinal axis. The aerosol dispenser comprises an outer container having an open top with a crimp ring therearound, the crimp ring having an upper surface and a lower surface opposed thereto, the upper surface and the lower surface being joined by an outer surface, an inside diameter surface being opposed to the outer surface, a shoulder disposed in spaced relationship below the crimp ring, a lower neck portion depending from the crimp ring to the shoulder, sidewalls depending below the shoulder, a closed end bottom joined to the sidewalls, a valve cup joined to the crimp ring, a valve joined to the valve cup for dispensing product from the outer container, a product delivery device disposed in the outer container, propellant disposed in the outer container and in operable relationship with the product delivery device, the valve cup having a platform defining a hole therethough to longitudinally receive a valve stem therein, an outer wall joined to the platform and depending radially outward of the crimp ring outer surface, and a crimp wall joined to the outer wall and clinched underneath the crimp ring lower surface, and at least one hole or vent disposed in the valve cup outer wall suitable to relieve a gas therethrough.

In one embodiment the invention comprises a valve cup for clinching to a crimp ring of an outer container for an aerosol dispenser, the valve cup having a longitudinal axis and a central platform defining a hole therethough to longitudinally receive a valve stem therein, an outer wall joined to the platform and depending therefrom, and a crimp wall joined to the outer wall and being clinchable underneath a crimp ring, and at least one hole disposed in and extending through the valve cup outer wall and being suitable to relieve a gas therethrough.

BRIEF DESCRIPTION OF THE DRAWINGS

FIG. 3 is a fragmentary perspective view of an outer container for the aerosol dispenser of the claimed invention having a fragmentary exploded gasket and an exploded sectional valve cup, the gasket being shown in phantom in position in the valve cup.

FIGS. 4A-4D are drawn to scale and taken from FIG. 3. The vents in FIGS. 4A-4D are shown in double cross hatch.

FIG. 4A is a fragmentary enlarged view of a crimp ring having axial vents on the outer surface.

FIG. 4B is a fragmentary enlarged view of a crimp ring having axial vents on the inner surface.

FIG. 4C is a fragmentary enlarged view of a crimp ring having axial vents on the outer surface and lower surface.

FIG. 4D is a fragmentary enlarged view of a crimp ring having axial vents on the outer surface, radial vents on the lower surface lower surface and inner surface, and further having a circumferential vent bridging the axial and radial vents, respectively vents on both the outer surface and lower surface and a circumferential vent bridging the axial vents on the inner surface.

FIGS. 5A1-8C are drawn to scale.

FIG. 5A1 is a perspective view of a valve cup having four equally spaced and equally sized vent holes and a valve.

FIG. 5A2 is a side elevational view of the valve cup and valve stem of FIG. 5A1.

FIG. 5A3 is a sectional view of the valve cup and valve stem of FIG. 5A2.

FIG. 5A4 is an enlarged fragmentary view taken from FIG. 5A3.

FIG. 5A5 is a top plan view of the valve cup of FIG. 5A1.

FIG. 5B1 is a perspective view of a valve cup having irregularly spaced and unequally sized vent holes with a valve.

FIG. 5B2 is a side elevational view of the valve cup and valve stem of FIG. 5B1.

FIG. 5B3 is a sectional view of the valve cup and valve stem of FIG. 5B2.

FIG. 5B4 is an enlarged fragmentary view taken from FIG. 5B3.

FIG. 5B5 is a top plan view of the valve cup of FIG. 5B1.

FIG. 6A is a top perspective view of a valve cup according to the present invention having radially inward fluted vents.

FIG. 6B is a bottom perspective view of the valve cup of FIG. 6A having the crimp wall omitted for clarity.

FIG. 6C is a side elevational view of the valve cup of FIG. 6A.

FIG. 6D is a vertical sectional view of the valve cup of FIG. 6C.

FIG. 6E is an enlarged fragmentary view taken from FIG. 6D.

FIG. 6F is a top plan view of the valve cup of FIG. 6A.

FIG. 7A is a top perspective view of a valve cup according to the present invention having radially outward fluted vents.

FIG. 7B is a bottom perspective view of the valve cup of FIG. 7A having the crimp wall omitted for clarity.

FIG. 7C is a side elevational view of the valve cup of FIG. 7A.

FIG. 7D is a vertical sectional view of the valve cup of FIG. 7C.

FIG. 7E is an enlarged fragmentary view taken from FIG. 7D.

FIG. 7F is a top plan view of the valve cup of FIG. 7A.

FIG. 8A is a top perspective view of a simplified valve cup according to the present invention and not having a platform or inner skirt wall.

FIG. 8B is a bottom perspective view of the valve cup of FIG. 8A having the crimp wall omitted for clarity.

FIG. 8C is a vertical sectional view of the valve cup of FIG. 8A.

FIG. 9 is a vertical sectional view of a simplified valve cup according to the present invention having only a crimp wall, outer wall and platform.

DETAILED DESCRIPTION OF THE INVENTION

Figure 1A:
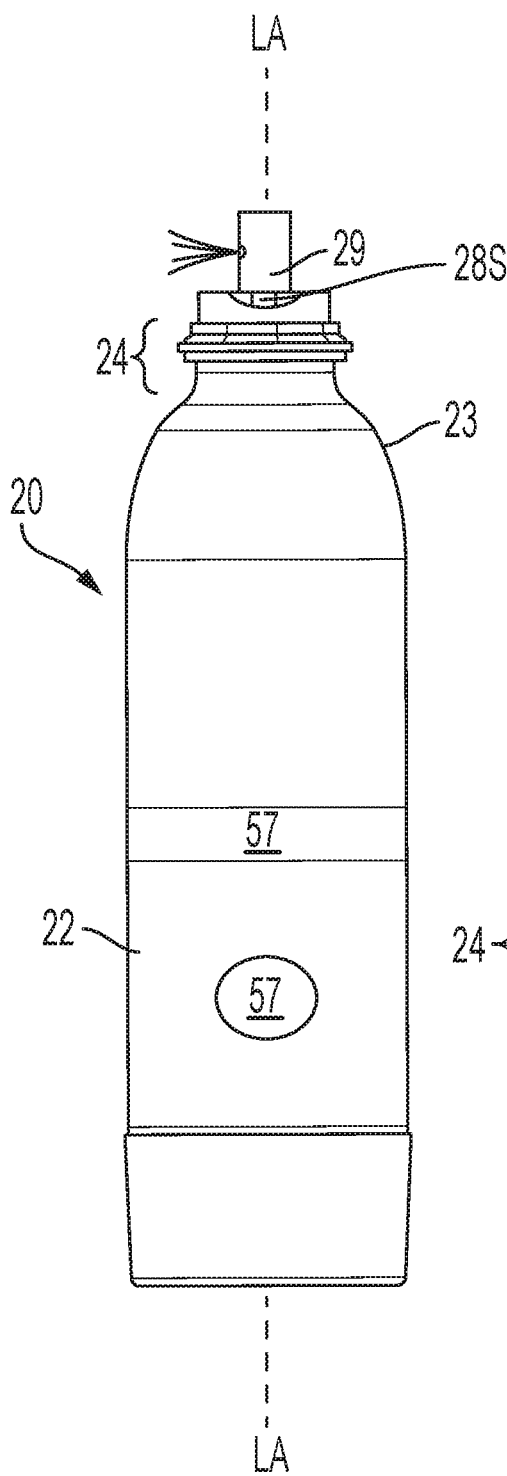
FIG. 1A is a side elevational view of an aerosol dispenser according to the present invention.
Figure 1C:
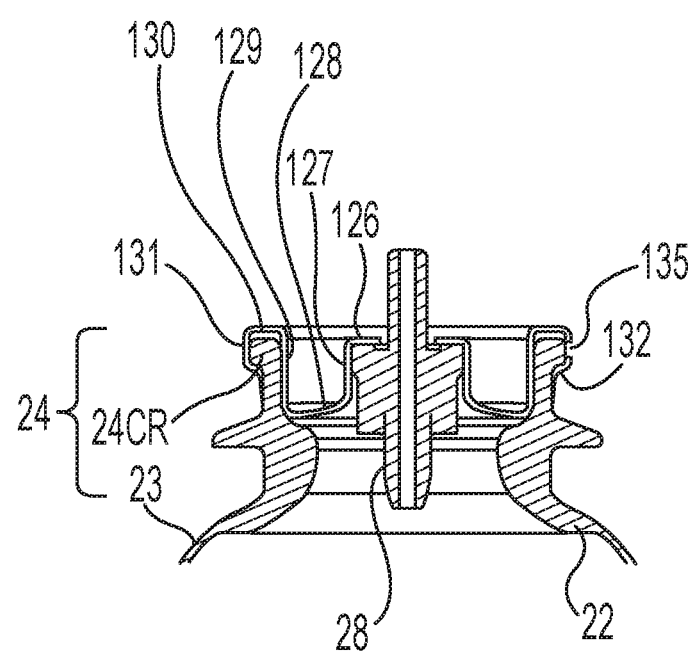
FIG. 1C is fragmentary vertical sectional of a representative valve cup with a valve therein and being clinched to a crimp ring.
Figure 1B:
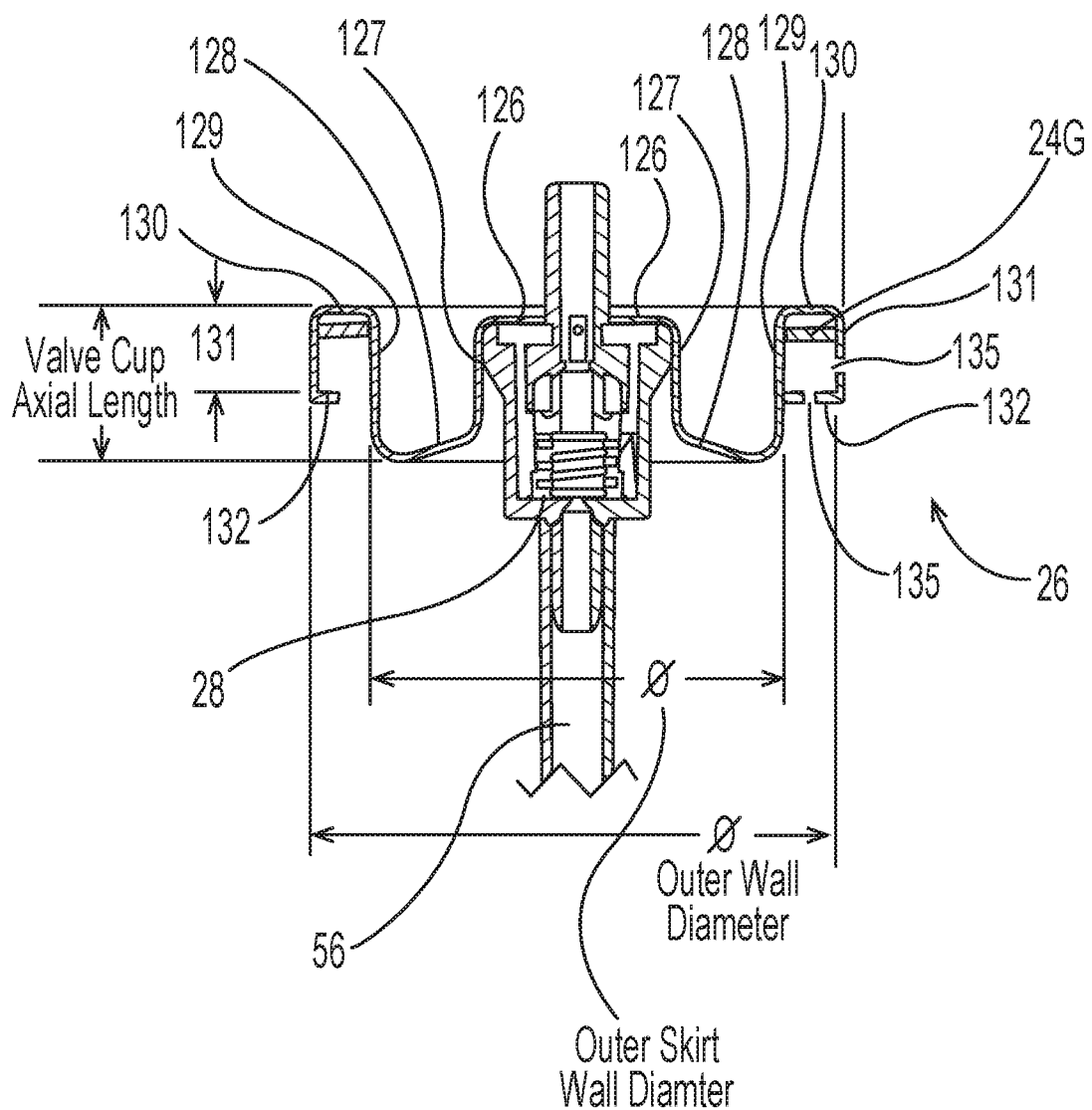
FIG. 1B is a fragmentary vertical sectional of a representative valve cup, valve and dip tube without being clinched to a crimp ring.

Referring to FIGS. 1A-1C, an aerosol dispenser 20 is shown. The aerosol dispenser 20 comprises a pressurizeable outer container 22 usable for such a dispenser. The outer container 22 may comprise plastic or metal, as are known in the art. The outer container 22 has both product 40 and propellant 42 disposed therein at the point of use.

The outer container 22 has an opening with a valve cup 26 therein therein. A user activated dispensing valve 28 may be disposed in the valve cup 26. A product delivery device may be joined to the valve cup 26. Propellant 40 may be disposed between the outer container 22 and the product delivery device. The product 42 and propellant 40 may be separately dispensed or may be dispensed together.

The aerosol dispensers 20, and components thereof, may have a longitudinal axis LA, and may optionally be axisymmetric with a round cross section. Alternatively, the outer container 22, a product delivery device therein, a dispensing valve 28, etc., may be eccentric and have a square, elliptical or other cross section.

The outer container 22 may have an opening. The opening is typically at the top of the pressurizeable container 22 when the pressurizeable container 22 is in its-in use position. The opening defines a neck 24, to which other components may be sealed. The neck 24 has a perimeter 24P, which defines the outside of the neck 24. The perimeter 24P of the neck 24 may have at least one vent 25, and optionally a plurality of vents 25. Optionally the neck 24 may be crystallized.

The top of the neck 24 may have a crimp ring 24CR thereon. The crimp ring 24CR extends radially outwardly from the neck 24 below. A metal valve cup 26 may be clinched to the crimp ring 24CR in known fashion. A gasket 24G may be disposed between the top of the crimp ring 24CR and the valve cup 26.

The valve cup 26 may be integral and formed from a single piece of metal comprising plural contiguous and annular walls. Alternatively, the valve cup 26 may comprise plastic, or any material suitable for forming around or welding to the crimp ring 24CR. Each wall of the valve cup 26 has opposed inner and outer surfaces, the inner surfaces generally facing downward or towards the longitudinal axis LA.

Referring to FIGS. 1A, 1B, 1C and 3, the valve cup 26 may have a center hole, to allow for a valve stem the longitudinally move therethrough. Radially outward from and adjacent the hole is an annular platform 126. Adjacent, radially outward from and contiguous the platform 126 is an annular inner skirt wall 127. Adjacent, radially outward from and contiguous the inner skirt wall 127 is an annular bottom wall 128. Adjacent, radially outward from and contiguous the bottom wall 128 is an annular outer skirt wall 129.

Preferably the outer skirt wall 129 is spaced away from the inside diameter surface 241 of the neck 24 to allow for ease of assembly. Adjacent, radially outward from and contiguous the outer skirt wall 129 is an annular top wall 130. The inner surface of the top wall 130 seals against the gasket 24G. Adjacent, radially outward from and contiguous the top wall 130 is an annular outer wall 131. The inner surface of the outer wall 131 seals against the outer surface 24CRO of the crimp ring 24CR. Adjacent, radially outward from and contiguous the outer wall 129 is an annular crimp wall 132. The crimp wall 132 engages the lower surface 24CRL of the crimp ring 24CR to clamp the valve cup 26 in place. The walls 126, 127, 128, 129, 130, 131, 132 are shown in concentric, parallel and orthogonal relationships, although the invention is not so limited. Any suitable angular relationship may be used.

One of skill will recognize than not all of the walls described above need to be present for a valve cup 26 according to the present invention to be viable. In simplified embodiment, the valve cup 26 may simply have a platform 126 with a hole therethrough. The hole slidably, longitudinally and/or translationally receive a valve 28, and particularly a valve stem therethrough. Radially outward of and directly or indirectly joined to the platform 126 is the outer wall. 131. The outer wall 131 depends downwardly from the platform 126. A crimp wall 132 is directly or indirectly joined to the outer wall 131. The crimp wall 132 is clinched under the crimp ring 24CR, radially inwardly, to hold the valve cup 26 in place.

The annular outer wall 131 may be perforate. By perforate it is meant that the outer wall 131 is gas permeable. Gas permeability is attained by one or more circumferentially spaced holes 135 through the outer wall 131. The holes 135 allow for exhausting of propellant 40 and/or product 42 therethrough which escapes past the gasket 24G to ambient. Likewise, the crimp wall 132 may be similarly perforate.

The holes 135 may be longitudinally centered, or intercept the crimp wall 132. The holes 135 may be equally or unequally sized, equally or unequally circumferentially spaced, and equally or unequally longitudinally disposed. For the system described herein, three to 15 spaced holes 135, having a diameter of 0.3 mm to 1 mm are believed to be suitable and particularly four holes equally spaced at 90 degrees and having a diameter of 0.8 mm is believed suitable.

Recycling class 1 thermoplastic elastomer [TPE] may be selected for the gasket 24G. The TPE material may be selected to be resistant to the propellant 40 and/or product 42 desired for use. A hydrophilic TPE-E based compound formulated to provide adhesion to PET and chemical resistance to silicone oil may be used as one or more components in the aerosol dispenser 20. Class 1 TPE material sold by Kraiburg TPE GmbH & Co KG of Waldkraiburg, Germany under the name Hcc8791-52 may be suitable.

A dispensing valve 28, in turn, may be disposed within the valve cup 26. The dispensing valve 28 provides for retention of product 42 within the aerosol dispenser 20 until the product 42 is selectively dispensed by a user. The product 42 may be dispensed through a dip tube 56 or from a bag 55, as is known in the art.

The dispensing valve 28 may be selectively actuated by an actuator 29. A suitable subcombination 21 may comprise the outer container 22, valve cup 26, dispensing valve 28, and any propellant 40 therein. The outer container 22, and valve 28 according to the present invention may be entirely polymeric and particularly entirely Stream 1 as defined by the Society of Plastics Engineers.

Selective actuation of the dispensing valve 28 allows the user to dispense a desired quantity of the product 42 on demand. Illustrative and nonlimiting products 42 for use with the present invention may include shave cream, shave foam, body sprays, body washes, perfumes, cleansers, air fresheners, astringents, foods, paints, etc.

Figure 2A:
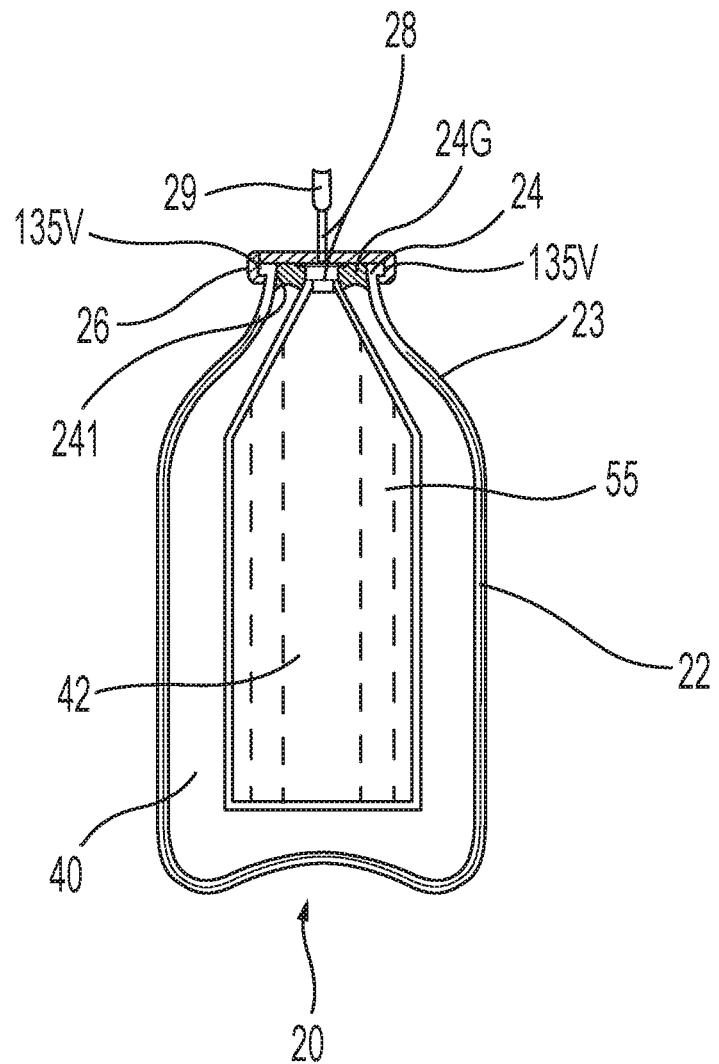
FIG. 2A is a side elevational sectional view of an aerosol dispenser having a collapsible bag.
Figure 2B:
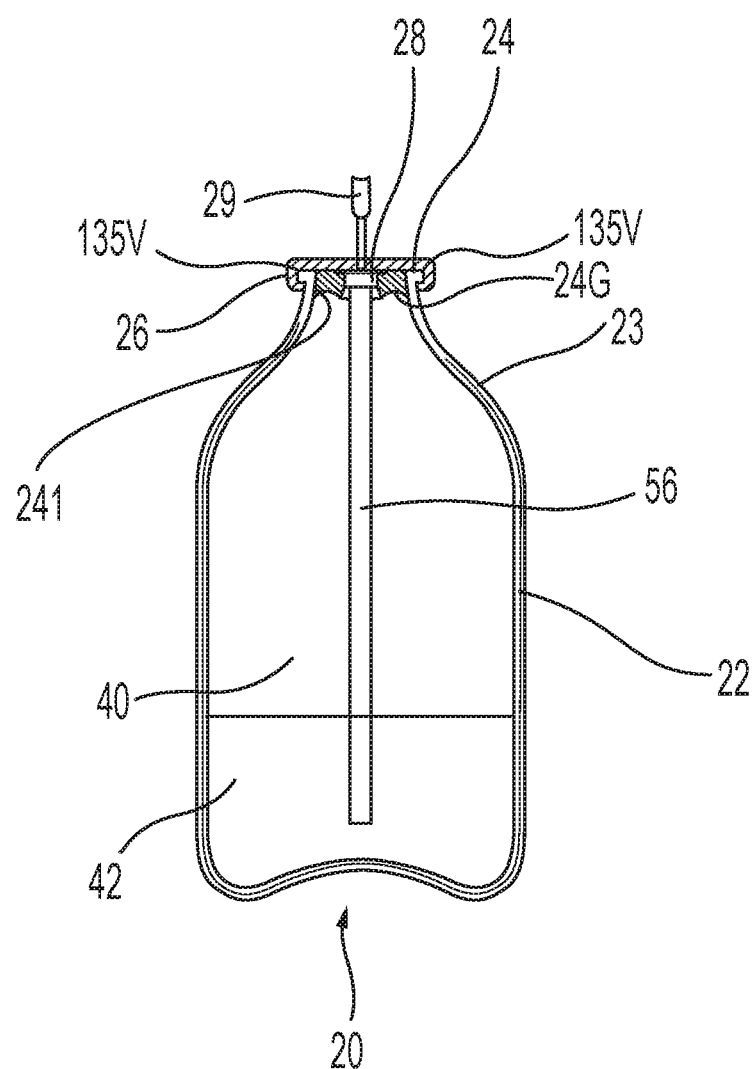
FIG. 2B is a side elevational sectional view an aerosol dispenser having a dip tube.

Referring to FIGS. 2A and 2B, inside the outer container 22 may be a product delivery device. The product delivery device may comprise a collapsible bag 55 as shown in FIG. 2A. The collapsible bag 55 may be mounted in sealing relationship to the neck 24 of the container and/or to the dispensing valve 28. This arrangement is known in the art as a bag-on-valve. The collapsible bag 55 may hold product 42 therein, and prevent intermixing of such product 42 with propellant 40. The propellant 40 may be stored outside the collapsible bag 55, and inside the outer container 22.

The collapsible bag 55 may expand upon being charged with product 42. Such expansion decreases the available volume inside the outer container 22. Decreasing the available volume increases the pressure of any propellant 40 therein according to Boyles law.

The product delivery device may alternatively or additionally comprise a dip tube 56 as shown in FIG. 2B. The dip tube 56 extends from a proximal end sealed to the dispensing valve 28. The dip tube 56 may terminate at a distal end juxtaposed with the bottom of the outer container 22. This embodiment provides for intermixing of the product 42 and propellant 40. Both are co-dispensed in response to selective actuation of the dispensing valve 28 by a user. Again, insertion of product 42 and/or propellant 40 into the outer container 22 increases pressure therein according to Boyles law. The product delivery device may alternatively comprise a piston as described in commonly assigned US publication 2016/0368633.

The outer container 22 may comprise a plastic pressurizeable container. The plastic may be polymeric, and particularly comprise PET. The dispensing valve 28, and optional valve cup 26 may be welded to the neck 24 of the outer container 22, as discussed below. The valve cup 26 may be clinched to the neck 24 in known fashion.

Any number of known valve assemblies 28 may be usable with the present invention. One suitable and non-limiting example, is shown. A suitable dispensing valve 28 may be made according to the teachings of commonly assigned publications 2010/0133301A1 and/or 2010/0133295A1, and forms no part of the claimed invention.

The pressurizeable container may further include a propellant 40. The propellant 40 may be disposed between the outer container 22 and the product delivery device. Alternatively propellant 40 may be disposed in the outer container 22 and/or the collapsible bag 55. Typically the pressure in the outer container 22 is greater than the pressure in the collapsible bag 55, so that product 42 may be dispensed from within the bag. If a dip tube 56 is selected for the product delivery device, the propellant 40 and product 42 may be intermixed, and thus co-dispensed. The pressure of the propellant 40 within the outer container 22 provides for dispensing of the product 42/co-dispensing of product 42/propellant 40 to ambient, and optionally to a target surface. The target surface may include a surface to be cleaned or otherwise treated by the product 42, skin, etc. Such dispensing occurs in response to the user actuating the dispensing valve 28.

Examining the components in more detail, the product delivery device may comprise a flexible, collapsible bag 55. The pressure boundary for the propellant 40 is formed, in part, by the collapsible bag 55. Or the product delivery device may comprise a dip tube 56. In either embodiment, the pressure boundary for the propellant 40 is formed, in part by the underside of the dispensing valve 28 when the valve 28 is closed.

If desired, the outer container 22, dispensing valve 28, dip tube 56 and/or collapsible bag 55 may be polymeric. By polymeric it is meant that the component is formed of a material which is plastic, comprises polymers, and/or particularly polyolefin, polyester or nylons. Thus, the entire aerosol dispenser 20 or, specific components thereof, may be free of metal, allowing exposure to microwave energy.

The valve cup 26 may comprise ductile and formable metal such as low carbon steel or aluminum. The valve cup 26 may be stamped and clinched in known fashion.

If desired, the outer container 22, collapsible bag 55, and/or dip tube 56, may be transparent or substantially transparent. If both the outer container 22 and a collapsible bag 55 used as the product delivery device are transparent, this arrangement provides the benefit that the consumer knows when product 42 is nearing depletion and allows improved communication of product 42 attributes, such as color, viscosity, etc. Also, labeling or other decoration 57 of the container 22 may be more apparent if the background to which such decoration is applied is clear. Alternatively or additionally, the outer container 22, collapsible bag 55, etc. may be transparent and colored with like or different colors.

The outer container 22 may define a longitudinal axis LA of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 40 cm in height, taken in the axial direction and from 4 to 60 cm in diameter if a round footprint is selected. The outer container 22 may have a volume ranging from 50 or 115 cc to 1000 cc exclusive of any components therein, such as a product delivery device. The outer container 22 may be injection stretch blow molded. If so, the injection stretch blow molding process may provide a stretch ratio of greater than 8, 8.5, 9, 9.5, 10, 12, 15 or 20.

The outer container 22 may sit on a base. The base is disposed on the bottom of the outer container 22 and of the aerosol dispenser 20. Suitable bases include petaloid bases, champagne bases, hemispherical or other convex bases used in conjunction with a base cup. Or the outer container 22 may have a flat base with an optional punt.

A punt is a concavity in the bottom of the container and extending towards the neck 24 of the container. A punt is distinguishable from a general concavity in the bottom of a container, as a punt has a smaller diameter than is defined by the footprint of the bottom of the container. The punt may be axisymmetric about the longitudinal axis LA. The vertex of the punt may be coincident the longitudinal axis LA. The outer container 22 sidewall also defines a diameter.

The plastic outer container 22 preferably does not creep under pressures ranging from 100 to 970 kPa, and having a sidewall thickness less than 0.5 mm. The outer container 22 may be pressurized to an internal gage pressure of 100 to 970, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, etc. The propellant 40 pressurizes the product 42 to a pressure greater than ambient, to provide for delivery from the aerosol dispenser 20.

The aerosol dispenser 20, as presented to a user may have an initial pressure. The initial pressure is the highest pressure encountered for a particular filling operation, and corresponds to no product 42 yet being dispensed from the product delivery device. As product 42 is depleted, the outer container 22 approaches a final pressure. The final pressure corresponds to depletion of substantially all product 42, except for small residual, from the product delivery device.

The outer container 22, and all other components, except the TPE gasket 24G, and valve cup 26 may comprise, consist essentially of or consist of PET, PEN, Nylon EVOH or blends thereof to meet DOT SP 14223. Such materials may be selected from a single class of recyclable materials, as set forth above by the SPI.

The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

The product 42 may also be inflammable. Flammability, and the absence thereof, may be determined in accordance with the absence of a fire point per ASTM D 92, Standard Test Method for Flash and Fire Points by Cleveland Open Cup Tester, by ASTM E-681 and/or EU A11 test methods.

The propellant 40 may comprise nitrogen, air hydrofluoroolefin and mixtures thereof. Propellant 40 listed in the US Federal Register 49 CFR 173.115, Class 2, Division 2.2 are also considered acceptable. The propellant 40 may particularly comprise a hydrofluoroolefin, a Trans-1,3,3,3-tetrafluoroprop-1-ene, 1-chloro-3,3,3-trifluoroprop-1-ene,(1E), and optionally a CAS number 1645-83-6 gas. Suitable propellants 40 are commercially available from Honeywell International of Morristown, N.J. under the trade names SOLSTICE® ZE (HFO-1234ze) and SOLSTICE® PF (HFO-1233zd(E)).

If desired, the propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user. A condensable propellant 40 provides the benefit of a flatter depressurization curve as product 42 is depleted during usage.

A condensable propellant 40 provides the benefit that a greater volume of gas may be placed into the container at a given pressure. Upon dispensing of a sufficient volume of product 42 from the space between the outer container 22 and the product delivery device, the condensable propellant 40 may flash back to a gaseous state of matter.

The pressurizeable container 22 may be charged with an amount of product 42 which brings the pressure, as initially presented to the user, sufficient to dispense and substantially deplete the product 42 from the aerosol dispenser 20. The final pressure, after substantially all product 42 is depleted, is less than the initial pressure.

Product 42 may be charged into the container through the dispensing valve 28, as is known in the art. When product 42 is charged into the container, the product 42 increases the pressure of the propellant 40. The increase in propellant 40 pressure occurs due to the increase in volume of the collapsible bag 55 if such a bag 55 is used as a product delivery device. Likewise, the increase in propellant 40 pressure occurs due to the increase in the number of moles of product 42 in the outer container 22 if a dip tube 56 is selected. An aerosol dispenser 20 may be made according to commonly assigned US 2012/0292338A1; US 2012/0291911A1; and/or US 2012/0291912A1.

The pressure of the propellant 40 at the end of the first phase of manufacture may correspond to the pressure at the end of the usable life of the aerosol dispenser 20, herein referred to as the final pressure. The pressure of the propellant 40 at the end of the second phase of manufacture may correspond to the pressure as initially presented to the user.

The propellant 40 may be provided at a pressure corresponding to the final pressure of the aerosol dispenser 20 when substantially all product 42 is depleted therefrom. The propellant 40 may be charged to a pressure of less than or equal to 300, 250, 225, 210, 200, 175 or 150 kPa. The propellant 40 may be charged to a pressure greater than or equal to 50, 75, 100 or 125 kPa. The gage pressures cited herein are to be construed as the initial pressure inside the outer container 22, as manufactured and prior to first use.

Plural valves 28 may be used with a single outer container 22. This arrangement provides the benefit that product 42 and propellant 40, or disparate products 42, are mixed at the point of use, allowing synergistic results between incompatible materials. This arrangement also provides the benefit that delivery of the propellant 40 provides motive force to the product 42, often resulting in smaller particle size distributions. Smaller particle size distributions can be advantageous for uniform product 42 distribution and minimizing undue wetting.

The aerosol dispenser 20, and particularly the outer container 22 thereof, may have a burst pressure of at least 1100 kPa at 54.4 degrees C. and further may have a burst pressure of at least 1650 kPa at 20 degrees C. Meeting these burst pressures is believed to avoid the need for using DOT exemptions.

Referring to FIG. 3, the outer container 22 may have a round crimp ring 24CR with an inner diameter oriented towards the longitudinal centerline LA and an outer diameter opposed thereto. The crimp ring 24CR have be thought of as having three conjoined surfaces, an upper surface 24CRU, a lower surface 24CRL opposed thereto, and an outer surface 24CRO joining the upper surface 24CRU and lower surface 24CRL. The three surfaces 24CRU, 24CRL and 24CRO are shown in parallel and orthogonal relationships, although the invention is not so limited. Any suitable angular relationship may be used.

The upper surface 24CRU of the crimp ring 24CR typically has two annular beads 242 to minimize leakage through the gasket 24G. The annular beads 242 are optional and form no part of the claimed invention. The upper surface 24CRU preferably does not form part of the vent 25 claimed herein.

Referring to FIGS. 4A-4D, the outer surface 24CRO of the crimp ring 24CR may have at least one vent 25. The vent 25 comprises a channel through the outer surface 24CRO and between the outer surface 24CRO and the valve cup 26. The vent 25 is integral with the neck 24, so that subsequent steps are not needed to make the vents operational and useful.

Preferably, the vent 25 extends throughout the entire length of the outer surface 24CRO. This arrangement provides for controlled release of pressure should overpressurization occur. More specifically, upon over pressurization, the neck 24 may bulge to a barrel shape, causing the upper surface 24CRU to deform concave inwardly. Propellant 42 and/or product 40 may the leak past the gasket 24G and be exhausted to ambient outwardly through the vents 25.

Plural vents 25, equally circumferentially spaced about the perimeter of the outer surface 24CRO may be used to provide adequate flow area for the exhaust. The flow area throttles the exhaust of propellant 42 and/or product 40 to safely depressurize the outer container 22. Circumferential spacing of the vents 25 allows for exhaust in the event deformation of the neck 24 is eccentric or occurs unevenly. The vents 25 are preferably integral with the underlying surface and outer container 22.

Optionally, vents 25 may also be disposed on the lower surface 24CRL of the crimp ring 24CR. These vents 25 are preferably aligned with the vents 25 on the outer surface 24CRO of the crimp ring 24CR. Preferably, the vents 25 extends throughout the entire length of the lower surface 24CRL to provide for adequate venting. These additional and optional vents 25 provide for venting between the lower surface 24CRL and the valve cup 26.

Further optionally, vents 25 may also be placed on the inside diameter surface 241 of the neck 24. Such vents 25 preferably extend in the longitudinal direction to at least the bottom of the valve cup 26 adjacent the inside diameter surface 241 of the neck 24. Preferably these vents 25 do not extend to the shoulder 23 or even the bottom of the neck 24 for strength. These additional and optional vents 25 provide for venting between the inside of the neck 24 and the valve cup 26. Again, preferably the For any of the aforementioned surfaces, i.e. the inner diameter of the neck 24, the upper surface CRU of the crimp ring 24, and lower surface 24CRL of the crimp ring 24L, one, two, or preferably at least three equally spaced vents 25 may be used. Six to 12 vents 25 are believed to be suitable. The vents 25 may be of constant cross section or variable cross section. The vents 25 may be of equal or unequal size, geometry and flow area. The vents 25 may be equally or unequally circumferentially spaced. The vents 25 may have any suitable cross section and hydraulic radius.

Referring particularly to FIG. 4D, optionally a circumferential vent 25 may connect the axial vents 25 on the outer surface 24CRU, the axial vents 25 on the inside diameter surface 241 of the crimp ring 24CRU, or the radial vents on the lower surface 24CRU. Such a circumferential vent prophetically allows cross communication between the aforementioned axial and radial vents.

Referring generally to FIGS. 4A-4D the vents 25 on the inner diameter of the neck 24 and outer surface 24CRO may be axially parallel or skewed relative to the longitudinal axis LA. The vents 25 on the lower surface 25CRL may be radially oriented, or radially skewed, such as spiral oriented. Again, preferably the upper surface 24CRU does not have vents 25 therethrough or vents 25 which interrupt the optional annular beads 242.

For a crimp ring 24CR having an outer radius of 32 mm, and an aerosol dispenser 20 having typical internal pressures, eight equally spaced vents 25, each having a radial depth of 0.8 millimeters may be used.

Referring to FIGS. 5A1-5A5, the valve cup 26 according to the invention may have one or more 135 therethrough. The holes 135 are disposed on the outer wall 130 to allow exhaust of propellant 40 and/or product 42 therethrough. The holes 135 may be disposed at any desired axial or circumferential position on the outer wall 131. The holes 135 may intercept the crimp wall 132, but preferably do not intercept the top wall 130.

Referring to FIGS. 5B1-5B5, while four holes 135 equally circumferentially spaced are shown, and axially centered on the outer wall 131 are shown, the invention is not so limited in the embodiment of FIGS. 5A1-5A5. The holes 135 may be axially or circumferentially spaced anywhere on the outer wall 131 and may intercept both the outer wall 131 and crimp wall 132.

Referring particularly to FIGS. 5B1, 5B2 and 5B4, the holes 135 may be axially stacked as shown in FIG. 5B4. And/or the holes 135 may be round, elongate in the axial direction, the circumferential direction as shown in FIGS. 5B1-5B2. The holes 135 may have any desired polygonal, round oval shape or other shape as desired.

Referring to FIGS. 6A-6F, the valve cup 26, and particularly the outer wall 131 thereof may be fluted to provide vents 135V. The vents 135V act as and have the geometry of channels and are believed to provide the same functionality as the holes 135 in the preceding embodiments. Preferably the vents 135 do not intercept the beads 242 on the upper surface 24CRU of the crimp ring 24CR. The vents 135 preferably extend to the bottom of the outer wall 131 to allow unimpeded venting.

The vents 135V may be of equal or unequal size, circumferential spacing, cross section and/or hydraulic radius. The vents 135V may be axially parallel or skewed relative to the longitudinal axis LA.

The vents 135V may be circumferentially spaced apart and alternately spaced apart by radially inwardly oriented ribs 136, providing channels for the vents 135V between adjacent ribs 136. The ribs 136 may be circumferentially narrower than the vents 135V to concentrate the compressive forces on the crimp ring 24CR. This geometry also provides a larger flow area for the vents 135V.

The alternately spaced ribs 136 and vents 135V may further extend to the inner surface of the crimp wall 132 in addition to the vents 135V in the outer wall 131. The ribs 136 and vents 135V disposed on the crimp wall 132 may be radially oriented or radially skewed. The vents 135V and holes 135 may be used in combination on the same valve cup 26, in either or both of the crimp wall 132 and/or outer wall 131.

Referring to FIGS. 7A-7F, another embodiment having alternately spaced ribs 136 and vents 135V is shown. This embodiment has radially outwardly oriented vents 135V. The geometry provides the benefit of circumferentially wider ribs 136. The wider ribs provide the benefit of greater contact area when clinching the valve cup 26 to the crimp ring 24CR. Also, the radially externally oriented vents 135V may be less prone to occluding from debris on the outside of neck 24.

Referring to FIGS. 8A-8C, an alternative embodiment of valve cup 26 is shown. This valve cup 26 has a simplified construction relative to the foregoing embodiments, yet retains all of the aforementioned variations and combinations of holes 135 and vents 135V. This valve cup 26 has a bottom wall 128, directly joined to an outboard outer skirt wall 129, which, in turn, is directly joined to an outboard top wall 130, which in turn is directly joined to an outboard outer wall 131, which in turn is directly joined to a radially inwardly extending crimp wall 132.

This arrangement has the benefit of eliminating the platform 126 and inner skirt wall 127, conserving material. The embodiment of FIGS. 8A-8C includes and subsumes all embodiments previously discussed herein.

Referring to FIG. 9, an alternative embodiment of valve cup 26 is shown. This valve cup 26 has a further simplified construction relative to the foregoing embodiments, yet retains all of the aforementioned variations and combinations of holes 135 and vents 135V. This valve cup 26 has a platform 126, which in turn is directly joined to an outboard outer wall 131, which in turn is directly joined to a radially inwardly extending crimp wall 132.

This arrangement has the benefit of eliminating the bottom wall 128 and inner skirt wall 127, further conserving material. The embodiment of FIG. 9 includes and subsumes all embodiments previously discussed herein.

The embodiments shown herein are shown to have annular features such as platform 126, bottom wall 128, top wall 130 and crimp wall 132 which are generally perpendicular to the longitudinal axis LA. And the embodiments shown herein are shown to have annular features such as inner skirt wall 127, outer skirt wall 129 and outer wall 131 which are generally parallel to the longitudinal axis LA. One of skill will recognize the invention is not so limited. The walls 126, 127, 128, 129, 130, 131 and 132 may be skewed relative to each other and/or the longitudinal axis. Concentricity is shown and presumed, although other geometries may be feasible.

The various embodiments disclosed herein are shown to have three walls 126, 131 and 132 in the embodiments of FIG. 9, five walls 128, 129, 130, 131 and 132 in the embodiments of FIGS. 8A-8C and seven walls 126, 127, 128, 129, 130, 131 and 132 in the embodiments of FIGS. 3-7F. It is understood that all three wall embodiments 126, 131 and 132 are inclusive of all embodiments have four, five or more walls 128, 129, 130, 131 and 132 and all five wall embodiments are inclusive of all embodiments having five, six seven or more walls 126, 127, 128, 129, 130, 131 and 132.

In various embodiments, the invention may be described according to the following paragraphs.

- A. An aerosol dispenser 20 for dispensing a product 42 therefrom and having a longitudinal axis LA, said aerosol dispenser 20 comprising:
  an outer container 22 having an open top with a crimp ring 24CR therearound, said crimp ring 24CR having an upper surface 24CRU and a lower surface 24CRL opposed thereto, said upper surface 24CRU and said lower surface 24CRL being joined by an outer surface 24CRO, an inside diameter surface being opposed to said outer surface 24CRO,
  a shoulder 23 disposed in spaced relationship below said crimp ring 24CR,
  a lower neck 24 portion depending from said crimp ring 24CR to said shoulder 23,
  sidewalls depending below said shoulder 23,
  a closed end bottom joined to said sidewalls,
  a valve cup 26 joined to said crimp ring 24CR,
  a valve joined to said valve cup 26 for dispensing product 42 from said outer container 22,
  a product 42 delivery device disposed in said outer container 22,
  propellant 40 disposed in said outer container 22 and in operable relationship with said product 42 delivery device,
  said valve cup 26 having a platform 126 defining a hole 135 therethough to longitudinally receive a valve stem therein, an outer wall 131 joined to said platform 126 and depending radially outward of said crimp ring 24CR outer surface 24CRO, and a crimp wall 132 joined to said outer wall 131 and clinched underneath said crimp ring 24CR lower surface 24CRL, and
  at least one hole 135 or vent 135V disposed in said valve cup 26 outer wall 131 suitable to relieve a gas therethrough.
- B. An aerosol dispenser 20 according to paragraph A comprising at least three holes 135 equally circumferentially spaced about said outer wall 131.
- C. An aerosol dispenser 20 according to paragraphs A and B comprising at least three holes 135 equally circumferentially spaced about said outer wall 131 and further comprising a plurality of holes 135 through said valve cup 26 crimp wall 132.
- D. An aerosol dispenser 20 according to paragraphs A, B and C comprising at least four holes 135 internal to and equally circumferentially spaced about said outer wall 131.
- E. An aerosol dispenser 20 according to paragraphs A, B, C and D wherein said product 42 delivery device comprises a dip tube 56.
- F. A valve cup 26 for clinching to a crimp ring 24CR of an outer container 22 for an aerosol dispenser 20, said valve cup 26 having a longitudinal axis LA and a central platform 126 defining a hole 135 therethough to longitudinally receive a valve stem therein, an outer wall 131 joined to said platform 126 and depending therefrom, and a crimp wall 132 joined to said outer wall 131 and being clinchable underneath a crimp ring 24CR, and at least one hole 135 disposed in and extending through said valve cup 26 outer wall 131 and being suitable to relieve a gas therethrough.
- G. A valve cup 26 according to paragraph F having a plurality of circumferentially spaced holes 135 through said outer wall 131.
- H. A valve cup 26 according to paragraphs F and G having a plurality of equally circumferentially spaced holes 135 through said outer wall 131.
- I. A valve cup 26 according to paragraphs F, G and H having a plurality of equally circumferentially spaced and equally axially spaced holes 135 through said outer wall 131.
- J. A valve cup 26 according to paragraphs F, G, H and I further comprising at least one hole 135 through said crimp wall 132.
- K. A valve cup 26 according to paragraphs F, G, H, I and J further comprising a plurality of circumferentially spaced holes 135 through said crimp wall 132.
- L. A valve cup 26 according to paragraphs F, G, H, I, J and K wherein said holes 135 are round and have a diameter ranging from 0.6 mm to 1.6 mm
- M. A valve cup 26 for clinching to a crimp ring 24CR of an outer container 22 for an aerosol dispenser 20, said valve cup 26 having a longitudinal axis LA and a central platform 126 defining a hole 135 therethough to longitudinally receive a valve stem therein, an outer wall 131 joined to said platform 126 and depending therefrom, and a crimp wall 132 joined to said outer wall 131 and being clinchable underneath a crimp ring 24CR, and at least one vent 135V disposed inside said valve cup 26 outer wall 131 and being suitable to relieve gas therethrough.
- N. A valve cup 26 according to paragraph M comprising a plurality of alternately circumferentially spaced vents 135V and ribs 136 disposed about and within said outer wall 131, said ribs 136 extending radially inwardly of said outer wall 131.
- O. A valve cup 26 according to paragraphs M and N comprising a plurality of alternately equally circumferentially spaced vents 135V and ribs 136 disposed about and within said outer wall 131, said ribs 136 extending radially inwardly of said outer wall 131.

P. A valve cup 26 according to paragraphs M, N and O comprising a plurality of alternately circumferentially spaced axially parallel vents 135V and axially parallel ribs 136 disposed about and within said outer wall 131, said ribs 136 extending radially inwardly of said outer wall 131.

Q. A valve cup 26 according to paragraphs M, N, O and P comprising a plurality of alternately equally circumferentially spaced vents 135V and ribs 136 disposed about and within said outer wall 131, said ribs 136 extending radially inwardly of said outer wall 131, each said vent 135V having a vent 135V circumferential width and each said rib 136 having a rib 136 circumferential width, said vent 135V circumferential width being greater than said rib 136 circumferential width.

R. A valve cup 26 according to paragraphs 13 comprising a plurality of alternately circumferentially spaced vents 135V and ribs 136 disposed about and within said outer wall 131, said ribs 136 extending radially inwardly of said outer wall 131, said valve cup 26 comprising from 10 to 20 equally spaced ribs 136.

S. A valve cup 26 according to paragraphs 18 wherein said ribs 136 collectively subtend from 35 to 65 degrees.

T. A valve cup 26 according to paragraphs 13 comprising a plurality of alternately circumferentially spaced vents 135V and ribs 136 disposed about and within said outer wall 131, said ribs 136 extending radially inwardly of said outer wall 131 and a plurality of alternately circumferentially spaced vents 135V and ribs 136 disposed about and within said crimp wall 132, said ribs 136 extending radially outward from said longitudinal axis LA.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aerosol dispenser for dispensing a product therefrom and having a longitudinal axis, the aerosol dispenser comprising:
    an outer container having an open top with a crimp ring therearound, the crimp ring having an upper surface and a lower surface opposed thereto, the upper surface and the lower surface being joined by an outer surface, an inside diameter surface being opposed to the outer surface,
    a shoulder disposed in spaced relationship below the crimp ring,
    a lower neck portion depending from the crimp ring to the shoulder,
    sidewalls depending below the shoulder,
    a closed end bottom joined to the sidewalls,
    a valve cup joined to the crimp ring,
    a valve joined to the valve cup for dispensing product from the outer container,
    a product delivery device disposed in the outer container,
    propellant disposed in the outer container and in operable relationship with the product delivery device,
    the valve cup having a platform defining a hole therethough to longitudinally receive a valve stem therein, a top wall joined to the platform and disposed on the crimp ring upper surface; an outer wall joined to the top wall and depending radially outward of the crimp ring outer surface, and a crimp wall joined to the outer wall and clinched underneath the crimp ring lower surface, and
    at least one hole disposed in the valve cup outer wall suitable to relieve a gas therethrough, wherein the at least one hole does not intercept the top wall.

2. An aerosol dispenser according to claim 1 comprising at least three holes equally circumferentially spaced about said outer wall.

3. An aerosol dispenser according to claim 1 comprising at least three holes equally circumferentially spaced about said outer wall and further comprising a plurality of holes through said valve cup crimp wall.

4. An aerosol dispenser according to claim 1 comprising at least four holes internal to and equally circumferentially spaced about said outer wall.

5. The aerosol dispenser according to claim 1 wherein the product delivery device comprises a dip tube.

6. The valve cup according to claim 1 having a plurality of circumferentially spaced holes through the outer wall.

7. The valve cup according to claim 6 wherein the holes are round and have a diameter ranging from 0.6 mm to 1.6 mm.

8. The aerosol dispenser according to claim 1, comprising a gasket disposed between the top wall and the crimp ring upper surface.

* * * * *